United States Patent
Yan (10) Patent No.: US 11,619,498 B2
(45) Date of Patent: Apr. 4, 2023

(54) VERIFICATION METHOD AND DEVICE FOR MODELING ROUTE, UNMANNED VEHICLE, AND STORAGE MEDIUM

(71) Applicant: Beijing Baidu Netcom Science Technology Co., Ltd., Beijing (CN)

(72) Inventor: Yongshan Yan, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/208,050

(22) Filed: Mar. 22, 2021

(65) Prior Publication Data
US 2021/0207964 A1   Jul. 8, 2021

(30) Foreign Application Priority Data

Jun. 9, 2020  (CN) .......................... 202010518104.7

(51) Int. Cl.
  *G01C 21/32*  (2006.01)
  *G01C 21/34*  (2006.01)
  (Continued)

(52) U.S. Cl.
  CPC ......... *G01C 21/32* (2013.01); *G01C 21/3415* (2013.01); *G01C 21/3667* (2013.01); *G06V 20/56* (2022.01); *G06V 20/647* (2022.01)

(58) Field of Classification Search
  None
  See application file for complete search history.

(56) References Cited

U.S. PATENT DOCUMENTS

| | | |
|---|---|---|
| 2011/0243457 A1 | 10/2011 | Miyajima |
| 2013/0182906 A1 | 7/2013 | Kojo et al. |

(Continued)

FOREIGN PATENT DOCUMENTS

| | | |
|---|---|---|
| CN | 106323301 A | 1/2017 |
| CN | 108961146 A | 12/2018 |

(Continued)

OTHER PUBLICATIONS

Extended European Search Report for corresponding European patent application No. 21159889.1 dated Aug. 26, 2021, nine pages.
Request for the Submission of an Opinion in corresponding Korean patent application No. 10-2021-0026283, dated Sep. 17, 2022, with English translation.

(Continued)

*Primary Examiner* — Anne Marie Antonucci
*Assistant Examiner* — Kyle S Park
(74) *Attorney, Agent, or Firm* — Harness, Dickey & Pierce, P.L.C.

(57) ABSTRACT

The present application discloses a verification method and device for a modeling route, an unmanned vehicle, and a storage medium, which relate to the technical field of computer vision and intelligent transportation. A specific implementation of the method in the present application lies in: acquiring a filtering threshold of a target road section, where the filtering threshold is related to image feature points corresponding to the target road section; verifying a modeling route corresponding to the target road section through the filtering threshold to obtain a verification result. According to the present application, availability of the modeling route can be directly verified with the filtering threshold while there is no need to verify the modeling route through manual driving of the vehicle, thereby effectively increasing the verification efficiency, protecting the vehicle from travelling along an unavailable modeling route and improving the driving experience.

15 Claims, 3 Drawing Sheets

Acquiring a filtering threshold of a target road section — S101

Verifying a modeling route corresponding to the target road section through the filtering threshold to obtain a verification result — S102

(51) Int. Cl.
  *G06K 9/00* (2022.01)
  *G01C 21/36* (2006.01)
  *G06V 20/56* (2022.01)
  *G06V 20/64* (2022.01)

(56) References Cited

U.S. PATENT DOCUMENTS

| | | | |
|---|---|---|---|
| 2016/0129907 A1 | 5/2016 | Kim et al. | |
| 2019/0266792 A1* | 8/2019 | Yao | G06T 7/55 |
| 2019/0272446 A1* | 9/2019 | Kangaspunta | G06K 9/6256 |
| 2019/0384304 A1* | 12/2019 | Towal | G06V 10/82 |
| 2020/0219388 A1* | 7/2020 | Liu | G08G 1/0141 |

FOREIGN PATENT DOCUMENTS

| | | |
|---|---|---|
| CN | 109764887 A | 5/2019 |
| CN | 109952547 A | 6/2019 |
| CN | 110375764 A | 10/2019 |
| CN | 110426046 A | 11/2019 |
| CN | 110505463 A | 11/2019 |
| CN | 110832279 A | 2/2020 |
| CN | 111160132 A | 5/2020 |
| JP | 2011215057 A | 10/2011 |
| JP | 2018533721 A | 11/2018 |
| JP | 2020042024 A | 3/2020 |
| WO | WO-2012172870 A1 | 12/2012 |
| WO | 2018126228 A1 | 7/2018 |
| WO | 2019052533 A1 | 3/2019 |

OTHER PUBLICATIONS

Decision to Grant a Patent in corresponding Japanese Patent Application No. 2021-050581, dated Dec. 20, 2022.
Roy, et al., "Route Planning for Automatic Indoor Driving of Smart Cars", 2020 IEEE 7th International Conference on Industrial Engineering and Applications, pp. 743-750.
Liu, Hongxing, "Research on Vehicle Control of Self-driving Vehicle Based on Visual Servoing", Classified Index: TP242.6, U.D.C: 621.586.4, May 2018.
Chen, et al., "3D Point Cloud Processing and Learning for Autonomus Driving", arXiv:2003.00601v1 [cs.CV] Mar. 1, 2020.
Office Action in corresponding China Patent Application No. 202010518104.7 dated Feb. 3, 2023.

* cited by examiner

VERIFICATION METHOD AND DEVICE FOR MODELING ROUTE, UNMANNED VEHICLE, AND STORAGE MEDIUM

CROSS-REFERENCE TO RELATED APPLICATION

This application claims priority to Chinese Patent Application No. 202010518104.7, filed on Jun. 9, 2020, which is hereby incorporated by reference in its entirety.

TECHNICAL FIELD

The present application relates to computer vision and intelligent transportation technologies in the field of data processing technology and, in particular, to a verification method and device for a modeling route, an unmanned vehicle, and a storage medium.

BACKGROUND

With the development of automobile technology, intelligent automobiles can build three-dimensional maps according to images collected by themselves.

In prior art, it is also necessary to verify availability of a route obtained by means of modeling after an automobile completes the route modeling. Generally, the verification method lies in making the vehicle drive according to a modeling route actually, and then determining whether the route is available.

However, the above-mentioned verification method is inefficient, and will be troublesome to the driver when the route is not available.

SUMMARY

The present disclosure provides a verification method and device for a modeling route, an unmanned vehicle, and a storage medium.

In a first aspect, an embodiment of the present disclosure provides a verification method for a modeling route, the method including:

acquiring a filtering threshold of a target road section, where the filtering threshold is related to image feature points corresponding to the target road section; and verifying a modeling route corresponding to the target road section through the filtering threshold to obtain a verification result.

In this embodiment, availability of the modeling route can be directly verified with the filtering threshold while there is no need to verify the modeling route through manual driving of the vehicle, thereby effectively increasing the verification efficiency, protecting the vehicle from travelling along an unavailable modeling route and improving the driving experience.

In a second aspect, an embodiment of the present disclosure provides a verification device for a modeling route, the device including:

an acquiring module, configured to acquire a filtering threshold of a target road section, where the filtering threshold is related to image feature points corresponding to the target road section; and a verifying module, configured to verify a modeling route corresponding to the target road section through the filtering threshold to obtain a verification result.

In this embodiment, availability of the modeling route can be directly verified with the filtering threshold while there is no need to verify the modeling route through manual driving of the vehicle, thereby effectively increasing the verification efficiency, protecting the vehicle from travelling along an unavailable modeling route and improving the driving experience.

In a third aspect, the present disclosure provides an unmanned vehicle, including: a processor and a memory, where the memory is stored with instructions executed by the processor; and where the processor is configured to execute the verification method for the modeling route according to any item of the first aspect by executing the executable instructions.

In a fourth aspect, the present disclosure provides a computer-readable storage medium having, stored thereon, a computer program which, when executed by a processor, implements the verification method for the modeling route according to any item of the first aspect.

In a fifth aspect, an embodiment of the present disclosure provides a program product, including: a computer program stored in a readable storage medium from which at least one processor of a server can read the computer program, where the at least one processor executes the computer program to cause the server to execute the verification method for the modeling route according to any item of the first aspect.

In a sixth aspect, the present disclosure provides a verification method for a modeling route, the method including:

acquiring a filtering threshold of a target road section; and verifying a modeling route corresponding to the target road section through the filtering threshold to obtain a verification result.

In this embodiment, availability of the modeling route can be directly verified with the filtering threshold while there is no need to verify the modeling route through manual driving of the vehicle, thereby effectively increasing the verification efficiency, protecting the vehicle from travelling along an unavailable modeling route and improving the driving experience.

BRIEF DESCRIPTION OF DRAWINGS

The accompanying drawings are used to better understand the solution, but do not constitute a limitation of the present disclosure. In which.

DESCRIPTION OF EMBODIMENTS

Exemplary embodiments of the present disclosure will be described below with reference to the accompanying drawings, which include various details of the embodiments of the present disclosure to facilitate understanding, and should be considered as merely exemplary. Therefore, persons of ordinary skill in the art should recognize that various changes and modifications can be made to the embodiments described herein without departing from the scope and spirit of the present disclosure. Likewise, for the sake of clarity and conciseness, descriptions of well-known functions and structures are omitted in the following description.

The terms "first", "second", "third", "fourth", etc. (if exist) in the specification and claims of the present disclosure and the above-mentioned accompanying drawings are used to distinguish similar objects, but not necessarily intended to describe a specific order or sequence. It should be understood that the data used in this way is interchangeable under appropriate circumstances, so that the embodiments of the present disclosure described herein, for example, can be implemented in an order other than those illustrated or described herein. In addition, the terms "including" and "having" and any variations of them are intended to cover non-exclusive inclusions. For example, processes, methods, systems, products, or devices including a series of steps or units are not necessarily limited to steps or units that are clearly listed, but may include other steps or units that are not clearly listed or inherent to these processes, methods, products or devices.

The following is a detailed description of the technical solution of the present disclosure with specific embodiments. The following specific embodiments may be combined with each other, and the same or similar concepts or processes may not be repeated in some embodiments.

With the development of automobile technology, intelligent automobiles can build three-dimensional maps according to images collected by themselves. In the prior art, it is also necessary to verify availability of a route obtained by means of modeling after an automobile completes the route modeling. Generally, the verification method lies in driving the vehicle according to a modeling route actually, and then determining whether the route is available. However, the above-mentioned verification method is inefficient and will be troublesome to the driver when the route is not available.

In view of the above-mentioned technical problem, the present disclosure aims to provide a verification method and device for a modeling route, an unmanned vehicle, and a storage medium, according to which availability of the modeling route can be directly verified with the filtering threshold while there is no need to verify the modeling route through manual driving of the vehicle, thereby effectively increasing the verification efficiency. The method provided in the present disclosure may be applied to an unmanned vehicle installed with a driving simulation system and the like.

Figure 1:
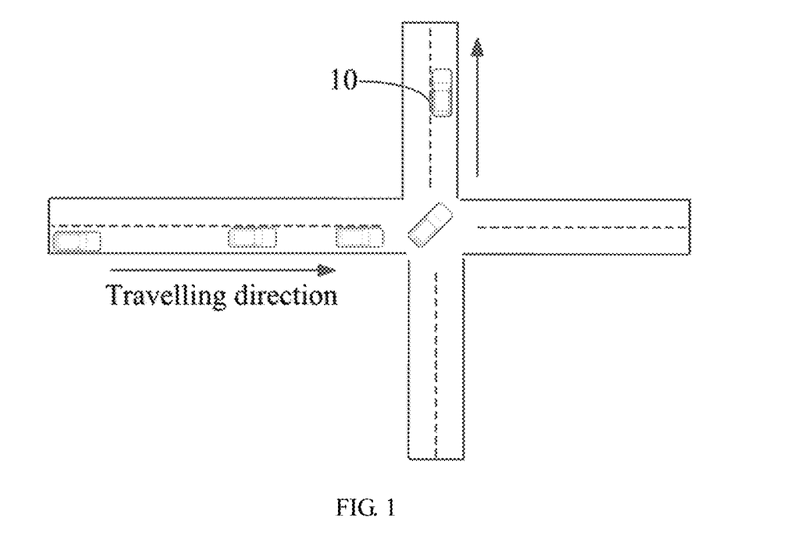
FIG. 1 is a schematic diagram of an application scenario according to an embodiment of the present disclosure.

FIG. 1 is a schematic diagram of an application scenario according to an embodiment of the present disclosure. As shown in FIG. 1, it is assumed that a vehicle 10 travels in an area where route modeling is not performed, and the vehicle 10 is installed with an image processor and various sensors (for example, a forward wide-angle camera, an ultrasonic sensor, etc.). During the travelling, the vehicle 10 may use the forward wide-angle camera to collect a video image, where the video image contains road information. The video image collected by the wide-angle camera is transmitted to the image processor, and a feature point extraction is performed by image processing software loaded in the image processor to obtain 2D feature points. Then, the image processor matches 2D feature points corresponding to images taken by different cameras at a same moment, so that the 2D feature points can be converted into 3D feature points. Finally, according to a modeling algorithm, a modeling route of the target road section is constructed through the 3D feature points. In the above-mentioned application scenario, the vehicle 10 may collect a video image containing road information through its own sensor, and then construct a modeling route through 3D feature points extracted from the video image. However, the modeling route generated by the vehicle needs to undergo availability verification before it can be put into use, so the verification problem for the modeling route will be involved.

Exemplarily, the entire modeling route generated by the vehicle may be split into multiple target road sections, and then the availability verification is performed on each target road section. Optionally, first acquiring a filtering threshold of each target road section, and then verifying the modeling route corresponding to the target road section through the filtering threshold to obtain a verification result. The modeling route generated by the vehicle can be put into use when all target road sections pass the verification.

The verification method and device for the modeling route, the unmanned vehicle, and the storage medium provided in the present disclosure relate to computer vision and intelligent transportation technologies in the field of data processing technology, where availability of the modeling route is directly verified with the filtering threshold while there is no need to verify the modeling route through manual driving of the vehicle, thereby effectively increasing the verification efficiency, protecting the vehicle from travelling along an unavailable modeling route and improving the driving experience.

Figure 2:
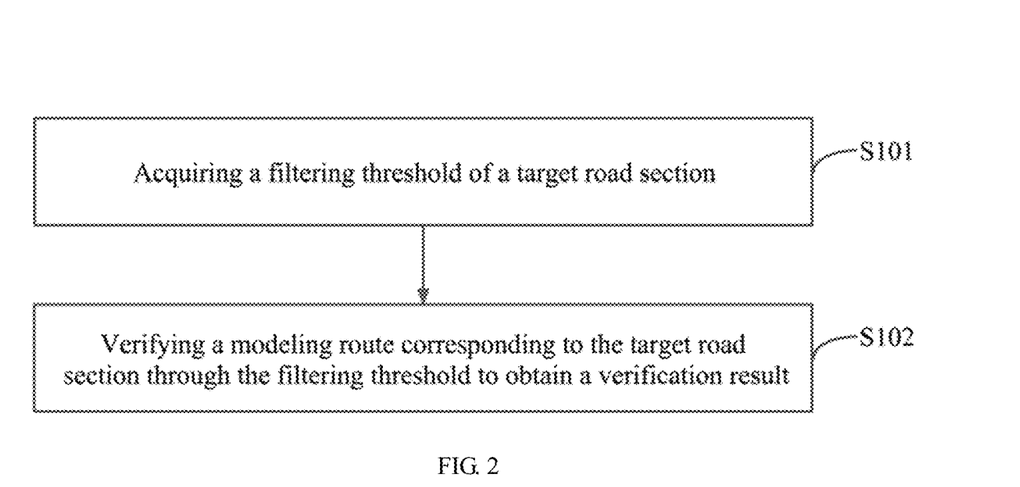
FIG. 2 is a schematic diagram according to a first embodiment of the present disclosure.

FIG. 2 is a schematic diagram according to the first embodiment of the present disclosure. As shown in FIG. 2, the method in this embodiment may include:

S101: acquiring a filtering threshold of a target road section.

S102: verifying a modeling route corresponding to the target road section through the filtering threshold to obtain a verification result.

The method in this embodiment may be applied in automatic driving in the field of data processing technology, for example, route modeling, automatic driving control and so on. After the filtering threshold of the target road section is acquired, availability of the modeling route can be directly verified with the filtering threshold while there is no need to verify the modeling route through manual driving of the vehicle, thereby effectively increasing the verification efficiency, protecting the vehicle from travelling along an unavailable modeling route and improving the driving experience.

Exemplarily, in Step S101, multiple image collections may be performed on the target road section, and then image feature points are counted based on each collected image to obtain a filtering threshold representing different dimensions. For example, N image collections can be performed on the target road section to obtain N image sets, where N is a natural number greater than 1; converting 2D feature points in the image sets into 3D feature points; counting respectively various parameter indicators corresponding to the N image sets, where the parameter indicators include: the number of 2D feature points, a conversion rate at which the 2D feature points are converted into 3D feature points, and the number of 3D feature points whose distance to a camera center is less than a preset threshold; and taking a minimum value of the various parameter indicators in the N image sets as a filtering threshold of the target road section. Among them, the filtering threshold is related to the image feature points corresponding to the target road section.

Exemplarily, performing feature point extraction on images in the N image sets respectively to obtain 2D feature points; performing matching on 2D feature points corresponding to images in each image set taken by different cameras at a same moment; and converting 2D feature points that undergo successful matching into the 3D feature points.

It should be noted that this embodiment does not limit the specific method for converting 2D feature points into 3D feature points, and existing algorithms for converting two-dimensional features to three-dimensional features can be applied in this embodiment.

Exemplarily, a vehicle can collect a video image of a road section through a camera when travelling on the road section. Then, a feature point extraction can be performed on the collected video image to obtain 2D feature points. Matching 2D feature points of images taken by two or more cameras to obtain a matched set of 2D feature points. Finally, converting the set of 2D feature points into 3D feature points. For the same road section, multiple image collections and feature point extractions can be performed to obtain the number of 2D feature points collected each time, the conversion rate of 2D to 3D points, and the number of nearby 3D feature points; and obtaining, by means of counting, the minimum value of the above-mentioned three indicators as the filtering threshold. For example, counting the number of 2D feature points at the time of the image feature point extraction. Then, counting the conversion rate of 2D to 3D points and the number of the 3D points at the time of the feature point conversion. If there are too few 3D points, it will directly cause the calculation error of camera pose to increase. Finally, counting the distribution of the 3D points, that is, counting respectively the number of nearby 3D points (3D points having a distance of less than 30 m to the camera center are defined as the nearby 3D points). The nearby 3D points will have a small error, which can ensure the accuracy of modeling. For the same road section, multiple collections can be performed; and for each round, one collection is performed to data correspondingly. Then, counting respectively the minimum values of the above-mentioned three dimensional indicators in all image frames of each round of data, and setting the filtering threshold through comparative analysis.

This embodiment allows for: performing N image collections on the target road section to obtain N image sets, and then counting respectively 2D feature points extracted from the N image sets, a conversion rate at which the 2D feature points are converted into 3D feature points, and the number of 3D feature points whose distance to a camera center is less than the preset threshold to obtain three indicators characterizing the image collection effect of the road section; obtaining three corresponding filtering thresholds by finding the minimum value of the three indicators of the N image sets. Therefore, a highly reliable filtering threshold can be counted based on the results of multiple collections, so that the result for subsequent availability determination of the modeling route is more accurate.

Exemplarily, a calculation formula of a conversion rate at which the 2D feature points are converted into 3D feature points is as follows:

$$K=U/V;$$

K represents a conversion rate at which the 2D feature points are converted into the 3D feature points, U represents the number of the 2D feature points, and V represents the number of the 3D feature points.

In this embodiment, the conversion rate at which the 2D feature points are converted into 3D feature points reflects the efficiency of feature point conversion. If there are too few 3D points, it will directly cause the calculation error of camera pose to increase. Therefore, the effectiveness of the feature points of the image collected at the target road section can be characterized through the conversion rate at which the 2D feature points are converted into 3D feature points. The higher the conversion rate at which the 2D feature points are converted into 3D feature points, the higher the quality of the image collections, which thus can be used to objectively evaluate the modeling effect of the modeling route.

Exemplarily, in Step S102, it may allow for acquiring various parameter indicators of the modeling route; determining that verification of the modeling route passes if the various parameter indicators of the modeling route are each greater than a corresponding filtering threshold.

Exemplarily, whether the modeling route is available can be determined through the filtering threshold, verification of the modeling route passes if the parameter indicators, such as the number of 2D feature points of the modeling route, the conversion rate at which the 2D feature points are converted into 3D feature points, the number of 3D feature points whose distance to the camera center is less than the preset threshold and the like, are each greater than the filtering threshold.

In this embodiment, availability of the modeling route can be verified with the filtering threshold corresponding to the various parameter indicators of the modeling route while there is no need to verify the modeling route through manual driving of the vehicle, thereby effectively increasing the verification efficiency, protecting the vehicle from travelling along an unavailable modeling route and improving the driving experience.

Exemplarily, after Step S102, it allows for storing the modeling route in a local memory and/or uploading to cloud if the verification result of the modeling route indicates that the verification passes.

In this embodiment, after the verification passes, the modeling route may be stored in the local memory for use with automatic driving of the vehicle. At the same time, the modeling route may also be uploaded to cloud to realize sharing of the modeling route. Therefore, users can construct navigation routes initiatively, the production efficiency of navigation map routes is improved, and it is convenient for more users to share modeling routes made by other users.

Exemplarily, after Step S102, it allows for prompting that the modeling route is not available if the verification result of the modeling route indicates that the verification does not pass.

In this embodiment, the user is prompted that the modeling route is not available if the verification result of the modeling route indicates that the verification does not pass, thereby protecting the user from using an incorrect navigation route or a navigation route of poor quality. Also, the user may be prompted in time to reconstruct the modeling route, so that the user can make a modeling route that meets the usability.

This embodiment may allow for: acquiring a filtering threshold of a target road section, where the filtering threshold is related to image feature points corresponding to the target road section; verifying a modeling route corresponding to the target road section through the filtering threshold to obtain a verification result. Therefore, availability of the modeling route can be directly verified with the filtering threshold while there is no need to verify the modeling route through manual driving of the vehicle, thereby effectively increasing the verification efficiency, protecting the vehicle from travelling along an unavailable modeling route and improving the driving experience.

Figure 3:
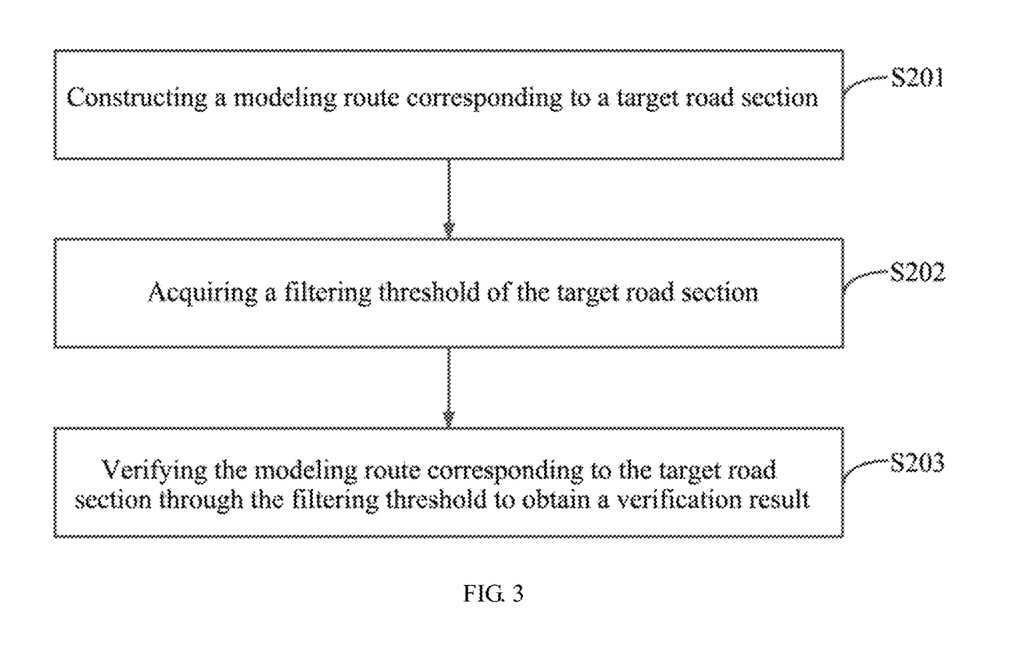
FIG. 3 is a schematic diagram according to a second embodiment of the present disclosure.

FIG. 3 is a schematic diagram according to a second embodiment of the present disclosure. As shown in FIG. 3, the method in this embodiment may include:

S201: constructing a modeling route corresponding to a target road section.

In this embodiment, when travelling on a target road section, the vehicle may collect an image of the target road section through a camera installed on the vehicle; then a feature extraction is performed on the image to obtain 3D feature points; and finally a modeling route corresponding to the target road section is constructed through the 3D feature points. Compared with the existing navigation route making method, the above-mentioned method may be completed spontaneously by the vehicle owner, thereby the efficiency of making the navigation route can be improved so that the route making is more personalized and meets customized requirements of users.

Exemplarily, in Step S201, it may allow for: performing an image collection on the target road section through different cameras; performing a feature point extraction on a collected image to obtain 2D feature points; performing matching on 2D feature points corresponding to images taken by different cameras at a same moment; converting 2D feature points that undergo successful matching into 3D feature points; constructing a modeling route of the target road section.

In this embodiment, various sensors are installed on the vehicle, such as a forward wide-angle camera, an ultrasonic sensor and so on, therefore, the forward wide-angle camera may be used to collect a video image. Then, a feature point extraction is performed on the collected image through the image feature point extraction algorithm to obtain 2D feature points. Then, matching is performed on 2D feature points corresponding to images taken by different cameras at a same moment; 2D feature points that undergo successful matching are converted into 3D feature points; finally a modeling route of the target road section is constructed using the 3D feature points. According to this method, a sensor of the vehicle itself may be directly used to complete the image collection of the target road section, and then a feature point extraction is performed based on the image to obtain 3D feature points that can be used to make a three-dimensional map route; compared to other existing navigation map route making methods, this method has low requirements for a collecting device, and almost all vehicles can have route making functions, and thus efficiency of making the map route can be effectively improved.

It should be noted that this embodiment does not limit the image feature point extraction algorithm, and existing image feature point extraction algorithms can be all applied in the present application.

Then, matching is performed on 2D feature points corresponding to images taken by different cameras at a same moment, so that the 2D feature points can be converted into 3D feature points. Finally, a modeling route of the target road section is constructed through the 3D feature points according to the modeling algorithm.

S202: acquiring a filtering threshold of the target road section.

S203: verifying the modeling route corresponding to the target road section through the filtering threshold to obtain a verification result.

In this embodiment, for specific implementation processes and technical principles of Step S202 to Step S203, please refer to related descriptions in Step S101 to Step S102 in the method shown in FIG. 2, which will not be repeated here.

This embodiment may allow for: acquiring a filtering threshold of a target road section, where the filtering threshold is related to image feature points corresponding to the target road section; verifying a modeling route corresponding to the target road section through the filtering threshold to obtain a verification result. Therefore, availability of the modeling route can be directly verified with the filtering threshold while there is no need to verify the modeling route through manual driving of the vehicle, thereby effectively increasing the verification efficiency, protecting the vehicle from travelling along an unavailable modeling route and improving the driving experience.

In addition, this embodiment may also allow for constructing a modeling route corresponding to a target road section before performing verification on the modeling route corresponding to the target road section through the filtering threshold. Therefore, availability of the modeling route can be directly verified with the filtering threshold while there is no need to verify the modeling route through manual driving of the vehicle, thereby effectively increasing the verification efficiency, protecting the vehicle from travelling along an unavailable modeling route and improving the driving experience.

Figure 4:
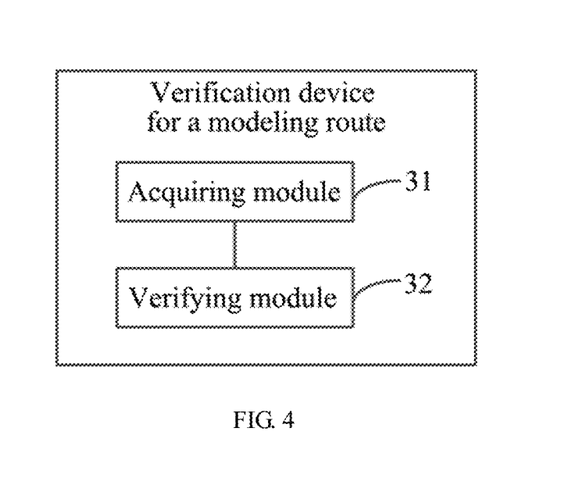
FIG. 4 is a schematic diagram according to a third embodiment of the present disclosure.

FIG. 4 is a schematic diagram according to a third embodiment of the present disclosure; as shown in FIG. 4, the device in this embodiment may include:

an acquiring module 31, configured to acquire a filtering threshold of a target road section, where the filtering threshold is related to image feature points corresponding to the target road section; and a verifying module 32, configured to verify a modeling route corresponding to the target road section through the filtering threshold to obtain a verification result.

In a possible design, the acquiring module 31 is specifically configured to:

perform N image collections on the target road section to obtain N image sets, where N is a natural number greater than 1;

perform feature point extraction on images in the N image sets respectively to obtain 2D feature points;

convert 2D feature points in the image sets into 3D feature points;

count respectively various parameter indicators corresponding to the N image sets, where the parameter indicators include: a number of 2D feature points, a conversion rate at which the 2D feature points are converted into the 3D feature points, and a number of 3D feature points whose distance to a camera center is less than a preset threshold;

take a minimum value of the various parameter indicators in the N image sets as a filtering threshold of the target road section.

In a possible design, converting 2D feature points in the image sets into 3D feature points includes: performing feature point extraction on images in the N image sets respectively to obtain 2D feature points; performing matching on 2D feature points corresponding to images in each image set taken by different cameras at a same moment; and converting 2D feature points that undergo successful matching into the 3D feature points.

In a possible design, a calculation formula of a conversion rate at which the 2D feature points are converted into 3D feature points is as follows:

$$K = U/V;$$

K represents a conversion rate at which the 2D feature points are converted into the 3D feature points, U represents a number of the 2D feature points, and V represents a number of the 3D feature points.

In a possible design, the verifying module 32 is specifically configured to:

acquire various parameter indicators of the modeling route; and determine that verification of the modeling route passes if the various parameter indicators of the modeling route are each greater than a corresponding filtering threshold.

The verification device of the modeling route in this embodiment can execute the technical solution in the method shown in FIG. 2; for specific implementation processes and technical principles thereof, please refer to the related description in the method shown in FIG. 2, which will not be repeated here.

This embodiment may allow for acquiring a filtering threshold of a target road section, where the filtering threshold is related to image feature points corresponding to the target road section; and verifying a modeling route corresponding to the target road section through the filtering threshold to obtain a verification result. Therefore, availability of the modeling route can be directly verified with the filtering threshold while there is no need to verify the modeling route through manual driving of the vehicle, thereby effectively increasing the verification efficiency, protecting the vehicle from travelling along an unavailable modeling route and improving the driving experience.

Figure 5:
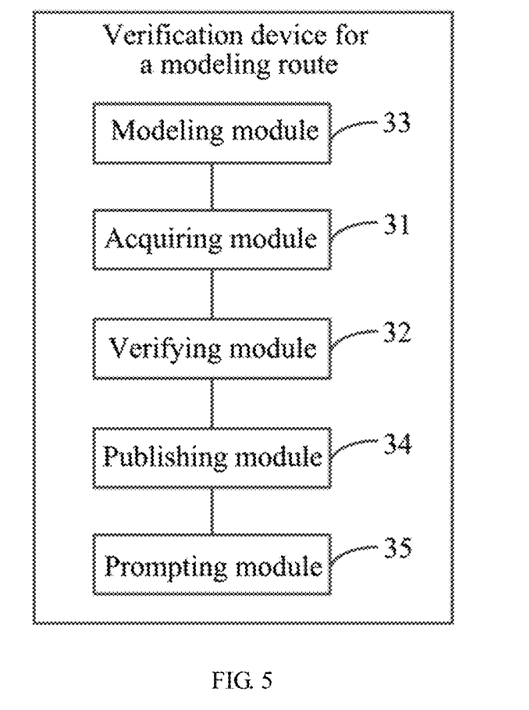
FIG. 5 is a schematic diagram according to a fourth embodiment of the present disclosure.

FIG. 5 is a schematic diagram according to a fourth embodiment of the present disclosure; as shown in FIG. 5, the device in this embodiment, based on the device shown in FIG. 4, may further include:

a modeling module 33 configured to: construct a modeling route corresponding to the target road section.

In a possible design, the modeling module 33 is specifically configured to:

perform an image collection on the target road section through different cameras;

perform a feature point extraction on a collected image to obtain 2D feature points;

perform matching on 2D feature points corresponding to images taken by different cameras at a same moment;

convert 2D feature points that undergo successful matching into 3D feature points; and construct a modeling route of the target road section through the 3D feature points.

In a possible design, further included is: a publishing module 34, configured to store the modeling route in a local memory and/or upload to cloud when the verification result indicates that the verification passes.

In a possible design, further included is: a prompting module 35, configured to prompt that the modeling route is not available when the verification result indicates that the verification does not pass.

The verification device of the modeling route in this embodiment can execute the technical solutions in the methods shown in FIG. 2 and FIG. 3; for specific implementation processes and technical principles thereof, please refer to the related descriptions in the methods shown in FIG. 2 and FIG. 3, which will not be repeated here.

This embodiment may allow for acquiring a filtering threshold of a target road section, where the filtering threshold is related to image feature points corresponding to the target road section; and verifying a modeling route corresponding to the target road section through the filtering threshold to obtain a verification result. Therefore, availability of the modeling route can be directly verified with the filtering threshold while there is no need to verify the modeling route through manual driving of the vehicle, thereby effectively increasing the verification efficiency, protecting the vehicle from travelling along an unavailable modeling route and improving the driving experience.

In addition, this embodiment may also allow for constructing a modeling route corresponding to a target road section before performing verification on the modeling route corresponding to the target road section through the filtering threshold. Therefore, availability of the modeling route can be directly verified with the filtering threshold while there is no need to verify the modeling route through manual driving of the vehicle, thereby effectively increasing the verification efficiency, protecting the vehicle from travelling along an unavailable modeling route and improving the driving experience.

Figure 6:
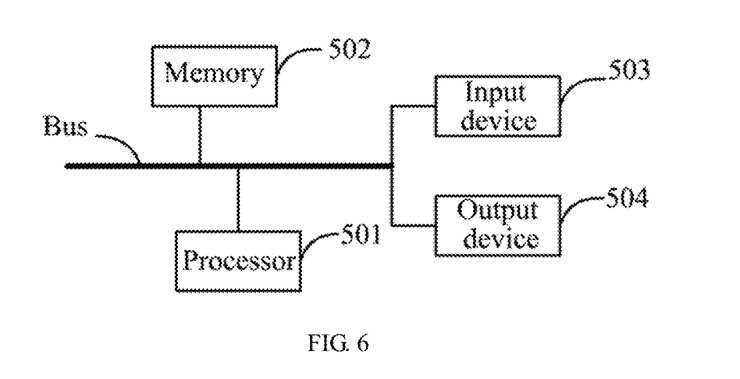
FIG. 6 is a block diagram of an unmanned vehicle for implementing an embodiment of the present disclosure.

FIG. 6 is a block diagram of an unmanned vehicle for implementing an embodiment of the present disclosure; as shown in FIG. 6, it is a block diagram of the unmanned vehicle of FIG. 6 according to an embodiment of the present disclosure. An electronic device is intended to represent various forms of digital computers, such as a laptop computer, a desktop computer, a workstation, a personal digital assistant, a server, a blade server, a mainframe computer, and other suitable computers. The electronic device can also represent various forms of mobile devices, such as a personal digital assistant, a cellular phone, a smart phone, a wearable device, and other similar computing devices. The components shown herein, their connections and relationships, and their functions are merely examples, and are not intended to limit the implementation of the present disclosure described and/or required herein.

As shown in FIG. 6, the unmanned vehicle includes: one or more processors 501, a memory 502, and interfaces for connecting various components, including high-speed interfaces and low-speed interfaces. The various components are connected to each other by using different buses, and may be installed on a common main board or installed in other ways as required. The processor may process instructions executed in the electronic device, including instructions stored in or on the memory to display graphical information of the GUI (Graphical User Interface) on an external input/output device (such as a display device coupled to an interface). In other implementations, multiple processors and/or multiple buses may be used with multiple memories if necessary. Similarly, multiple electronic devices can be connected, and each device provides some necessary operations (for example, as a server array, a group of blade servers, or a multi-processor system). One processor 501 is taken as an example in FIG. 6.

The memory 502 is a non-transitory computer-readable storage medium provided in the present disclosure, where the memory is stored with instructions executable by at least one processor to cause at least one processor to execute the verification method for the modeling route of the unmanned vehicle in FIG. 6 provided by the present disclosure. The non-transitory computer-readable storage medium of the present disclosure is stored with computer instructions, where the computer instructions are configured to cause a computer to execute the verification method for the modeling route of FIG. 6 provided by the present disclosure.

As a non-transitory computer-readable storage medium, the memory 502 may be configured to store non-transitory software programs, non-transitory computer-executable programs and modules, such as program instructions/modules corresponding to the verification method of the modeling route in FIG. 6 in the embodiment of the present disclosure. The processor 501 executes various functional applications and data processing of the server, that is, realizing the verification method for the modeling route in FIG. 6 in the above-mentioned method embodiments, by running non-transitory software programs, instructions, and modules stored in the memory 502.

The memory 502 may include a program storage area and a data storage area, where the program storage area can store an operating system and an application program required by at least one function; and the data storage area can store data created according to the use of the unmanned vehicle of FIG. 6, etc. In addition, the memory 502 may include a high-speed random-access memory, and may also include a non-transitory memory, such as at least one magnetic disk memory, a flash memory device or other non-transitory solid-state storage devices. In some embodiments, the memory 502 may optionally include memories remotely set with respect to the processor 501, and these remote memories may be connected to the unmanned vehicle of FIG. 6 through network connection. Examples of the above-mentioned network include, but are not limited to, the Internet, corporate intranets, local area networks, mobile communication networks, and combinations thereof.

The unmanned vehicle in FIG. 6 may also include: an input device 503 and an output device 504. The processor 501, the memory 502, the input device 503 and the output device 504 may be connected through a bus or other methods. The connection through a bus is taken as an example in FIG. 6.

The input device 503 can receive input digital or character information, and generate a key signal input related to the user settings and function control of the unmanned vehicle in FIG. 6, such as touch screen, keypad, mouse, track pad, touch pad, and indicating rod, one or more mouse buttons, trackball, joystick and other input devices. The output device 504 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some implementations, the display device may be a touch screen.

Various implementations of the systems and technologies described herein may be implemented in a digital electronic circuit system, an integrated circuit system, an ASIC (application-specific integrated circuit), a GPU (graphics processor), an FPGA (field programmable gate array) device, computer hardware, firmware, software, and/or their combination. These various implementations may include: being implemented in one or more computer programs, where the one or more computer programs may be executed and/or interpreted on a programmable system including at least one programmable processor, where the programmable processor may be a dedicated or general-purpose programmable processor that can receive data and instructions from the storage system, at least one input device, and at least one output device, and transmit the data and instructions to the storage system, the at least one input device, and the at least one output device.

These computer programs (also called programs, software, software applications, or codes) include machine instructions of programmable processors, and can be implemented using high-level procedures and/or object-oriented programming languages, and/or assembly/machine languages. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to a programmable processor, including machine-readable media that receive machine instructions as machine-readable signals. The term "machine readable signals" refer to any signal for providing machine instructions and/or data to a programmable processor.

In order to provide interaction with the user, the systems and techniques described herein can be implemented on a computer, where the computer has: a display device for displaying information to the user (for example, a CRT (cathode ray tube) or an LCD (liquid crystal display) monitor); and a keyboard and pointing device (for example, a mouse or trackball) through which the user can provide input to the computer. Other types of devices can also be configured to provide interaction with the user; for example, the feedback provided to the user may be any form of sensory feedback (for example, visual feedback, auditory feedback, or tactile feedback); and can be receive input from the user in any form (including acoustic input, voice input, or tactile input).

The systems and technologies described herein can be implemented in a computing system that includes background components (for example, as a data server), or a computing system that includes middleware components (for example, an application server), or a computing system that includes front-end components (for example, a user computer with a graphical user interface or a web browser through which the user can interact with the implementation of the system and technology described herein), or a computing system that includes any combination of such background components, middleware components, or front-end components. The components of the system can be connected to each other through any form or medium of digital data communication (for example, a communication network). Examples of communication networks include: local area networks (LAN), wide area networks (WAN) and the Internet.

The computing system may include a client and a server. The client and server are generally far away from each other and usually interact through a communication network. The relationship between the client and the server is generated through computer programs running on the corresponding computers and having a client-server relationship with each other.

It should be understood that the various forms of processes shown above may be used to reorder, add or delete steps. For example, the steps described in the present application may be executed in parallel, sequentially, or in a different order, as long as the desired result of the technical solution disclosed in the present disclosure may be achieved, and this is not limited herein.

The above-mentioned specific implementations do not constitute a limitation to the protection scope of the present disclosure. Persons skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for verifying availability of a modeling route, the method being applied to a vehicle, and comprising:
   acquiring filtering thresholds of a target road section; and
   verifying the availability of a modeling route to be verified corresponding to the target road section through the filtering thresholds to obtain a verification result, wherein the modeling route to be verified is a navigation route to be verified which is obtained by means of modeling;

wherein the acquiring the filtering thresholds of the target road section comprises:

performing, by different cameras of the vehicle, N image collections on the target road section to obtain N image sets, wherein N is a natural number greater than 1;

converting 2D feature points in the N image sets into 3D feature points;

counting respectively various parameter indicators corresponding to the N image sets, wherein the parameter indicators comprise: a number of the 2D feature points, a conversion rate at which the 2D feature points are converted into the 3D feature points, and a number of 3D feature points whose distances to a camera center are less than a preset threshold, wherein the parameter indicators characterize image collection effect of the target road section; and taking minimum values of the various parameter indicators in the N image sets as the filtering thresholds of the target road section;

wherein the verifying the availability of the modeling route to be verified corresponding to the target road section through the filtering thresholds to obtain the verification result comprises:

acquiring various parameter indicators of the modeling route to be verified; and determining that the verification result is that the modeling route to be verified is available when the various parameter indicators of the modeling route to be verified are each greater than a corresponding filtering threshold.

2. The verification method according to claim 1, wherein the converting the 2D feature points in the N image sets into the 3D feature points comprises:

performing feature point extraction on images in the N image sets respectively to obtain the 2D feature points;

performing matching on the 2D feature points corresponding to the images in each image set taken by the different cameras at a same moment; and converting 2D feature points that undergo successful matching into the 3D feature points.

3. The verification method according to claim 1, wherein a calculation formula of the conversion rate at which the 2D feature points are converted into the 3D feature points is as follows:

$K=U/V;$

K represents a conversion rate at which the 2D feature points are converted into the 3D feature points, U represents the number of the 2D feature points, and V represents the number of the 3D feature points.

4. The verification method according to claim 1, before the verifying the availability of the modeling route to be verified corresponding to the target road section through the filtering thresholds to obtain the verification result, further comprising:

constructing the modeling route to be verified corresponding to the target road section.

5. The verification method according to claim 4, wherein the constructing the modeling route to be verified corresponding to the target road section comprises:

performing an image collection on the target road section through the different cameras;

performing a feature point extraction on a collected image to obtain 2D feature points;

performing matching on the 2D feature points corresponding to images taken by the different cameras at a same moment;

converting 2D feature points that undergo successful matching into 3D feature points; and constructing the modeling route to be verified of the target road section through the 3D feature points.

6. The verification method according to claim 1, further comprising at least one of:

storing the modeling route to be verified in a local memory and uploading to cloud if the verification result is that the modeling route to be verified is available.

7. The verification method according to claim 1, further comprising:

prompting that the modeling route to be verified is not available if the verification result is that the modeling route to be verified is not available.

8. A non-transitory computer-readable storage medium stored with computer instructions which are configured to cause a computer to execute the method according to claim 1.

9. An unmanned vehicle, comprising:

at least one processor; and a memory communicatively connected with the at least one processor;

wherein the memory is stored with instructions executable by the at least one processor, and the instructions are executed by the at least one processor to cause the at least one processor to:

acquire filtering thresholds of a target road section; and verify availability of a modeling route to be verified corresponding to the target road section through the filtering thresholds to obtain a verification result, wherein the modeling route to be verified is a navigation route to be verified which is obtained by means of modeling;

wherein the at least one processor is configured to:

control different cameras of the unmanned vehicle to perform N image collections on the target road section to obtain N image sets, wherein N is a natural number greater than 1;

convert 2D feature points in the N image sets into 3D feature points;

count respectively various parameter indicators corresponding to the N image sets, wherein the parameter indicators comprise: a number of the 2D feature points, a conversion rate at which the 2D feature points are converted into the 3D feature points, and a number of 3D feature points whose distances to a camera center are less than a preset threshold, wherein the parameter indicators characterize image collection effect of the target road section; and take minimum values of the various parameter indicators in the N image sets as the filtering thresholds of the target road section;

wherein the at least one processor is configured to:

acquire various parameter indicators of the modeling route to be verified; and determine that verification result is that the modeling route to be verified is available when the various parameter indicators of the modeling route to be verified are each greater than a corresponding filtering threshold.

10. The verification device according to claim 9, wherein the at least one processor is further configured to:

perform feature point extraction on images in the N image sets respectively to obtain the 2D feature points;

perform matching on the 2D feature points corresponding to the images in each image set taken by the different cameras at a same moment; and convert 2D feature points that undergo successful matching into the 3D feature points.

11. The verification device according to claim 9, wherein a calculation formula of the conversion rate at which the 2D feature points are converted into the 3D feature points is as follows:

$$K=U/V;$$

K represents a conversion rate at which the 2D feature points are converted into the 3D feature points, U represents the number of the 2D feature points, and V represents the number of the 3D feature points.

12. The verification device according to claim 9, wherein the at least one processor is configured to:

construct the modeling route to be verified corresponding to the target road section.

13. The verification device according to claim 12, wherein the at least one processor is configured to:

perform an image collection on the target road section through the different cameras;

perform a feature point extraction on a collected image to obtain 2D feature points;

perform matching on 2D feature points corresponding to images taken by the different cameras at a same moment;

convert 2D feature points that undergo successful matching into 3D feature points; and construct the modeling route to be verified of the target road section through the 3D feature points.

14. The verification device according to claim 9, wherein the at least one processor is configured to at least one of store the modeling route to be verified in a local memory and upload to cloud when the verification result is that the modeling route to be verified is available.

15. The verification device according to claim 9, wherein the at least one processor is configured to prompt that the modeling route to be verified is not available when the verification result is that the modeling route to be verified is not available.

* * * * *